(12) United States Patent
Kowalczyk et al.

(10) Patent No.: US 10,281,005 B2
(45) Date of Patent: May 7, 2019

(54) CABLE PULLING ASSEMBLY

(71) Applicant: COMMSCOPE TECHNOLOGIES LLC, Hickory, NC (US)

(72) Inventors: Scott C. Kowalczyk, Savage, MN (US); David E. Maxam, St. Paul, MN (US); Greg Hanninen, Shakopee, MN (US); John D. Moser, Wylie, TX (US)

(73) Assignee: CommScope Technologies LLC, Hickory, NC (US)

( * ) Notice: Subject to any disclaimer, the term of this patent is extended or adjusted under 35 U.S.C. 154(b) by 29 days.

(21) Appl. No.: 15/169,174

(22) Filed: May 31, 2016

(65) Prior Publication Data

US 2016/0349474 A1    Dec. 1, 2016

Related U.S. Application Data

(60) Provisional application No. 62/168,370, filed on May 29, 2015.

(51) Int. Cl.
| | |
|---|---|
| *G02B 6/54* | (2006.01) |
| *F16G 11/00* | (2006.01) |
| *G02B 6/44* | (2006.01) |
| *G02B 6/38* | (2006.01) |

(52) U.S. Cl.
CPC ............ *F16G 11/00* (2013.01); *G02B 6/4465* (2013.01); *G02B 6/54* (2013.01); *G02B 6/3887* (2013.01)

(58) Field of Classification Search
None
See application file for complete search history.

(56) References Cited

U.S. PATENT DOCUMENTS

| | | |
|---|---|---|
| 2,231,919 A | 2/1941 | Kent |
| 3,672,006 A | 6/1972 | Fidrych |
| 33,672,006 | 6/1972 | Fidrych |
| 3,858,848 A | 1/1975 | MacFetrich |
| 3,906,619 A | 9/1975 | Schaffer |
| 4,368,910 A | 1/1983 | Fidrych |
| 4,453,291 A | 6/1984 | Fidrych |
| 4,460,159 A | 7/1984 | Charlebois et al. |
| 4,684,161 A | 8/1987 | Egner et al. |
| 4,684,211 A | 8/1987 | Weber et al. |
| 4,736,978 A | 4/1988 | Cielker |
| 5,013,125 A | 5/1991 | Nilsson et al. |
| 5,039,196 A | 8/1991 | Nilsson |

(Continued)

FOREIGN PATENT DOCUMENTS

| | | |
|---|---|---|
| DE | 42 00 865 A1 | 7/1993 |
| JP | 59-177504 | 10/1984 |

(Continued)

*Primary Examiner* — Chad H Smith
(74) *Attorney, Agent, or Firm* — Merchant & Gould P.C.

(57) ABSTRACT

A cable pulling assembly includes an enclosure that is adapted for enclosing an SC type connector end of a fiber optic cable. The enclosure includes a first member that defines a first cavity. The first cavity is adapted to receive a portion of a SC connector. The enclosure further includes a second member that is selectively engaged to the first member. The second member defines a second cavity. The second member may be structurally identical to the first member. The enclosure is adapted to transfer a tensile force applied to the enclosure to the strength layer of the fiber optic cable.

22 Claims, 4 Drawing Sheets

(56) References Cited

U.S. PATENT DOCUMENTS

| | | | |
|---|---|---|---|
| 50,339,196 | | 8/1991 | Nilsson |
| 5,067,843 | A | 11/1991 | Nova |
| 5,122,007 | A | 6/1992 | Smith |
| 5,133,583 | A | 7/1992 | Wagman et al. |
| 5,134,677 | A | 7/1992 | Leung et al. |
| 5,245,730 | A | 9/1993 | Martin |
| 5,283,930 | A | 2/1994 | Krauss |
| 5,308,026 | A | 5/1994 | Shaw |
| 5,317,663 | A | 5/1994 | Beard et al. |
| 5,480,203 | A | 1/1996 | Favalora et al. |
| 5,863,083 | A | 1/1999 | Giebel et al. |
| 5,938,180 | A | 8/1999 | Walsten |
| 6,101,305 | A | 8/2000 | Wagman et al. |
| 6,266,469 | B1 | 7/2001 | Roth |
| 6,396,993 | B1 | 5/2002 | Giebel et al. |
| 6,398,422 | B1 | 6/2002 | Szilagyi et al. |
| 6,719,274 | B2 | 4/2004 | Bowling |
| 6,993,237 | B2 | 1/2006 | Cooke et al. |
| 7,079,734 | B2 | 7/2006 | Seddon et al. |
| 7,246,789 | B2 | 7/2007 | Ames et al. |
| 7,481,585 | B2 | 1/2009 | Scadden et al. |
| 7,621,675 | B1 | 11/2009 | Bradley |
| 7,878,717 | B2 | 2/2011 | Schube et al. |
| 8,165,444 | B2 | 4/2012 | Pierce et al. |
| 8,272,787 | B2 | 9/2012 | Lu et al. |
| 8,412,017 | B2 | 4/2013 | Kowalczyk et al. |
| 8,577,199 | B2 | 11/2013 | Pierce et al. |
| 8,620,129 | B2 * | 12/2013 | Rudenick .............. G02B 6/4433 156/293 |
| 9,885,847 | B2 | 2/2018 | Kowalczyk et al. |
| 2006/0133748 | A1 | 6/2006 | Seddon et al. |
| 2008/0240658 | A1 | 10/2008 | Leeman et al. |
| 2009/0238534 | A1 | 9/2009 | Ahmed |
| 2009/0286038 | A1 | 11/2009 | Swift et al. |
| 2010/0202748 | A1 * | 8/2010 | Pierce ...................... G02B 6/54 385/136 |
| 2010/0322584 | A1 | 12/2010 | Kowalczyk et al. |
| 2011/0135268 | A1 | 6/2011 | Rudenick et al. |
| 2018/0180832 | A1 | 6/2018 | Kowalczyk et al. |

FOREIGN PATENT DOCUMENTS

| | | |
|---|---|---|
| WO | WO 2005/072395 A2 | 8/2005 |
| WO | WO 2008/036994 A1 | 4/2008 |
| WO | WO 2009/040567 A1 | 4/2009 |
| WO | 2010129785 A1 | 11/2010 |
| WO | 2011066363 A2 | 6/2011 |

* cited by examiner

CABLE PULLING ASSEMBLY

CROSS-REFERENCE TO RELATED APPLICATION

This application claims the benefit of U.S. Provisional Patent Application Ser. No. 62/168,370, filed May 29, 2015, which application is hereby incorporated by reference in its entirety.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new construction.

In either case, however, fiber optic cables are usually routed through enclosed spaces, such as between support structures disposed inside walls. In order to get the fiber optic cable through these enclosed spaces, cable pullers can be used. However, cable pullers are not always preferred since the size of cable pullers can prevent the cable from being pulled through small enclosed spaces.

SUMMARY

An aspect of the present disclosure relates to a cable pulling assembly. The cable pulling assembly includes an enclosure that is adapted for enclosing an end of a fiber optic cable. A removable enclosure is adapted for enclosing an end of a fiber optic cable. The end of the fiber optic cable includes an SC-type (SC) connector. The removable enclosure includes a removable first member that defines a first cavity. The first cavity is adapted and contoured to removably engage a first portion of the SC connector, and the first cavity is adapted to receive the end of the fiber optic cable. The first cavity defines a shoulder. The shoulder is positioned on the removable first member to engage the first portion of the SC connector. The enclosure further includes a second member. The removable second member is adapted to removably engage the removable first member. The removable second member defines a second cavity. The second cavity defines a second shoulder. The second shoulder is positioned on the removable second member to engage a second portion of the SC connector. The second member further includes a removable enclosure that is adapted to transfer a tensile force applied to the removable enclosure to a strength layer of the fiber optic cable.

Another aspect of the present disclosure relates to a method of installing a cable pulling assembly that is adapted for an SC connector of a fiber optic cable. The method includes placing an end of a fiber optic cable in the cavity defined by an enclosure having a first member and second member. When the end of the fiber optic cable is placed in the enclosure, an SC connector of the fiber optic cable may be aligned to engage a shoulder attached to the base of the first member. The method includes the step of aligning installation guides on a first member with an alignment openings of a second member. The method further includes aligning a resilient tab on the first member with an alignment groove on a second member. The method may also include aligning a resilient tab on a second member with an alignment groove on a the first member. The method further includes engaging the installation guide with the alignment openings and engaging the resilient tabs with the alignment grooves.

Another aspect of the present disclosure relates to a cable pulling assembly comprising a fiber optic cable having an end with an SC connector engaged to the end of the fiber optic cable. The disclosure also includes a removable enclosure enclosing the SC connector of the fiber optic cable. The removable enclosure includes: a removable first member that defines a first cavity. The first cavity is adapted and contoured to removably engage a portion of the SC connector of the fiber optic cable. The first cavity is defined by a shoulder. The shoulder is positioned on the removable first member to engage the first portion of the SC connector, and a removable second member is removably engaged to the removable first member. Also in the disclosure, the removable second member defines a second cavity. The second cavity is adapted and contoured to receive a remaining portion of the SC connector of the fiber optic cable. The second cavity is defined by a second shoulder. The second shoulder is positioned on the removable second member to engage a second portion of the SC connector. The removable enclosure is adapted to engage an axial end of the SC connector when a tensile force is applied to the removable enclosure so that the tensile force is applied to a strength layer of the fiber optic cable through the SC connector.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
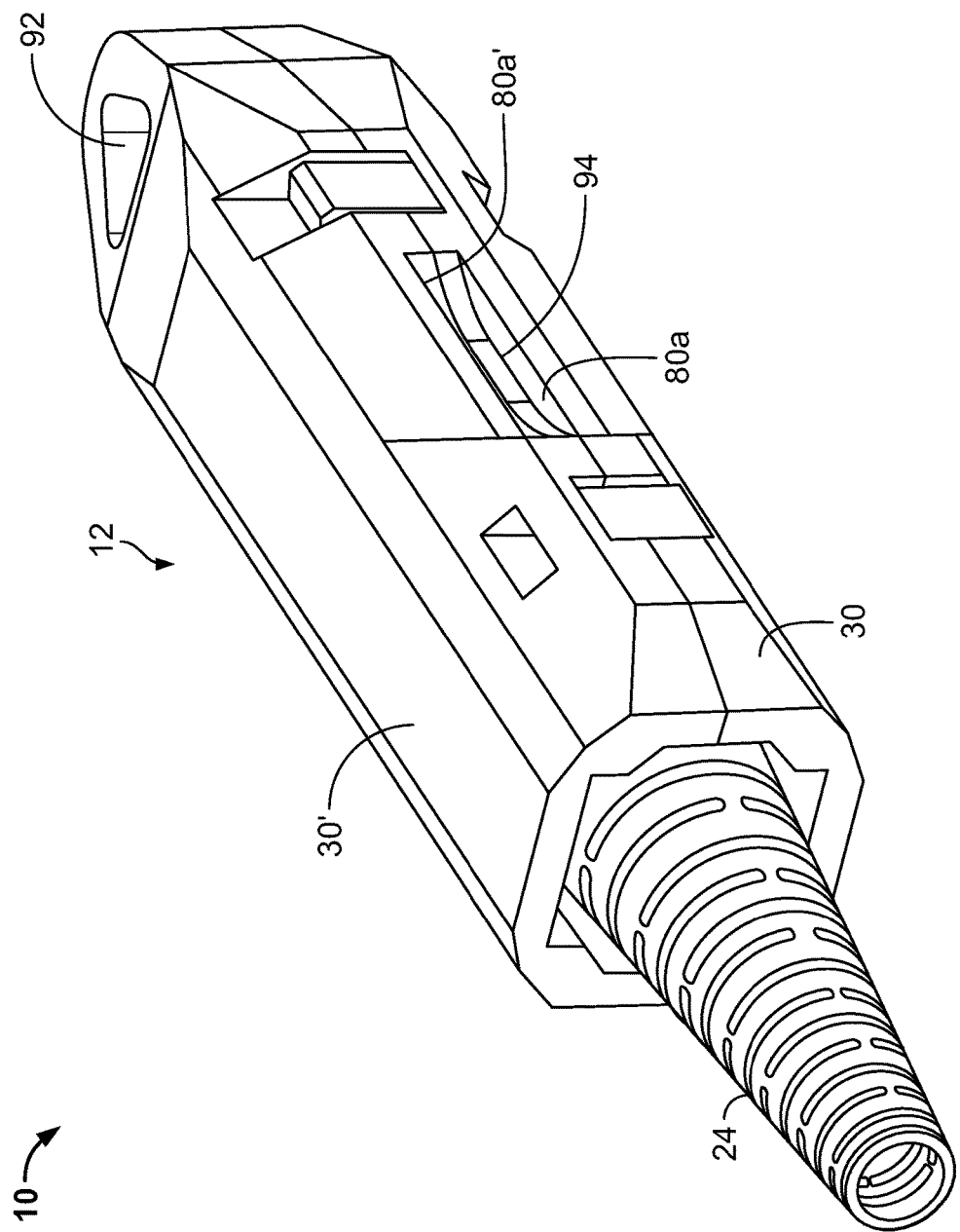
FIG. 1 is a perspective view of a cable pulling assembly having exemplary features of aspects of the principles of the present disclosure.
Figure 2:
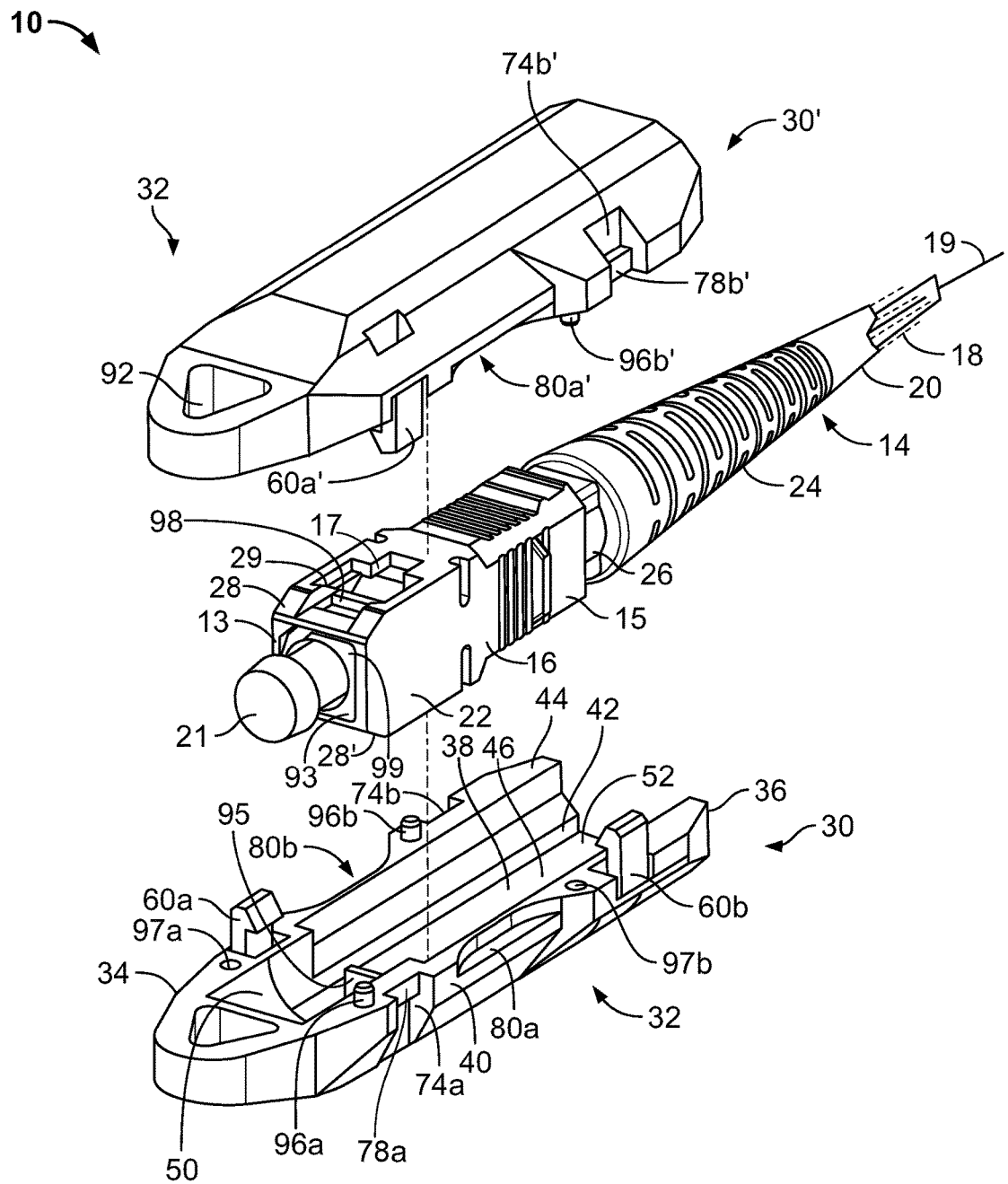
FIG. 2 is an exploded perspective view of the cable pulling assembly of FIG. 1.

Referring now to FIGS. 1 and 2, a cable pulling assembly, generally designated 10, is shown. The cable pulling assembly 10 includes an enclosure 12. The enclosure 12 is adapted to enclose an end 13 of a fiber optic cable 14.

In one aspect of the present disclosure, the end 13 of the fiber optic cable 14 includes a connector 15. The connector 15 may be a multi-fiber connector or a single fiber connector. The connector 15 is engaged to the fiber optic cable 14. In one aspect of the present disclosure, the fiber optic cable 14 includes a strength layer 18 that surrounds an optical fiber 19. The strength layer 18 is engaged to the connector 15 through crimping. This engagement of the connector 15 to the strength layer 18 allows axial force applied to the connector 15 to be applied to the strength layer 18.

The strength layer 18 is adapted to inhibit axial tensile loading from being applied to the optical fiber 19. In certain embodiments, the strength layer 18 can include yarns, fibers, threads, tapes, films, epoxies, filaments, or other structures. In a preferred embodiment, the strength layer 18 includes aramid yarns (e.g., KEVLAR® yarns). An outer jacket 20 is disposed around the strength layer 18.

In one aspect of the present disclosure, the end 13 of the fiber optic cable 14 further includes a dust cap 21 disposed over a first axial end 22 of the connector 15. A strain relief boot 24 is disposed at a second axial end 26 of the connector 15.

The enclosure 12 includes a first member 30 and a second member 30'. In one aspect of the present disclosure, the first member 30 is releasably engaged to the second member 30'. In one aspect of the present disclosure, the second member 30' is substantially structurally similar to the first member 30. In another aspect of the present disclosure, the second member 30' is structurally identical to the first member 30. As the features of the second member 30' are substantially structurally similar to the features of the first member 30, described above, the features of the second member 30' will not typically be redundantly described. The structurally similar or structurally identical features of the second member 30' will have the same reference numerals as the corresponding features of the first member 30 followed by a prime (') symbol.

In one aspect of the present disclosure, the connector 15 may be symmetric or substantially symmetric and thereby include features that are opposite each other. As the features opposite each other may be substantially structurally similar to each other, the features that are opposite features described herein will not typically be redundantly described. The structurally similar or structurally identical opposite features of the connector 15 will have the same reference numerals as the corresponding features followed by the prime (') symbol.

Referring now to FIGS. 3-6, the first member 30 is shown. The first member 30 includes a body 32. The body 32 of the first member 30 includes a first axial end portion 34 and an oppositely disposed second axial end portion 36.

The body 32 further includes a base 38 and a sidewall 40 that extends outwardly from the base 38. The sidewall 40 includes a first end 42 that is engaged to the base 38 and an oppositely disposed second end 44. The second end 44 is generally planar in shape and forms a longitudinal surface. In one aspect of the present disclosure, the first end 42 is integral with the base 38.

The base 38 and the sidewall 40 cooperatively define a connector cavity 46 (see FIG. 2). The connector cavity 46 is adapted to receive a portion of the end 13 of the fiber optic cable 14. In one aspect of the present disclosure, the connector cavity 46 is a blind cavity. As a blind cavity, the connector cavity 46 does not extend through the first and second axial end portions 34, 36 of the body 32. The blind cavity prevents the fiber optic cable 14 from passing through the first and second axial ends 34, 36 of the body 32 of the enclosure 12.

A shoulder 95 is attached to the base 38 of the first member 30 and extends from the base 38 in a perpendicular direction. As depicted, the shoulder 95 extends from a base end 110 on the base 38 to a cantilevered end 112 spaced away from the base end 110 (see FIG. 5). The shoulder 95 extends between a first end 102 and a second end 104 (see FIG. 3). The shoulder 95 extends between a first side 106 and a second side 108 (see FIG. 5). As depicted, the ends 102, 104, the sides 106, 108, and the ends 110, 112 are substantially orthogonal to each other. The shoulder 95 is orientated on the base 38 such that the shoulder 95 may connect to the fiber optic connector 15 and thereby connect to the fiber optic cable 14. Similarly, in the second member 30', a second shoulder 95' may be placed on the base 38'. A connection with the fiber optic cable 14 may be established when the shoulder 95 passes through a void 17 in the connector 15 and engages a ridge 98 in an inner front housing (ferrule holder) 93 of the connector 15. Similarly, a second connection with the fiber optic cable 14 may be established when the shoulder 95' passes through a void 17' in the connector 15 and engages a ridge 98' in the inner front housing 93 of the connector 15. In certain embodiments, the orientation of the shoulder 95, 95' relative to the base 38, 38' is configured to engage a fiber optic cable 14 with an SC connector 15.

Figure 3:
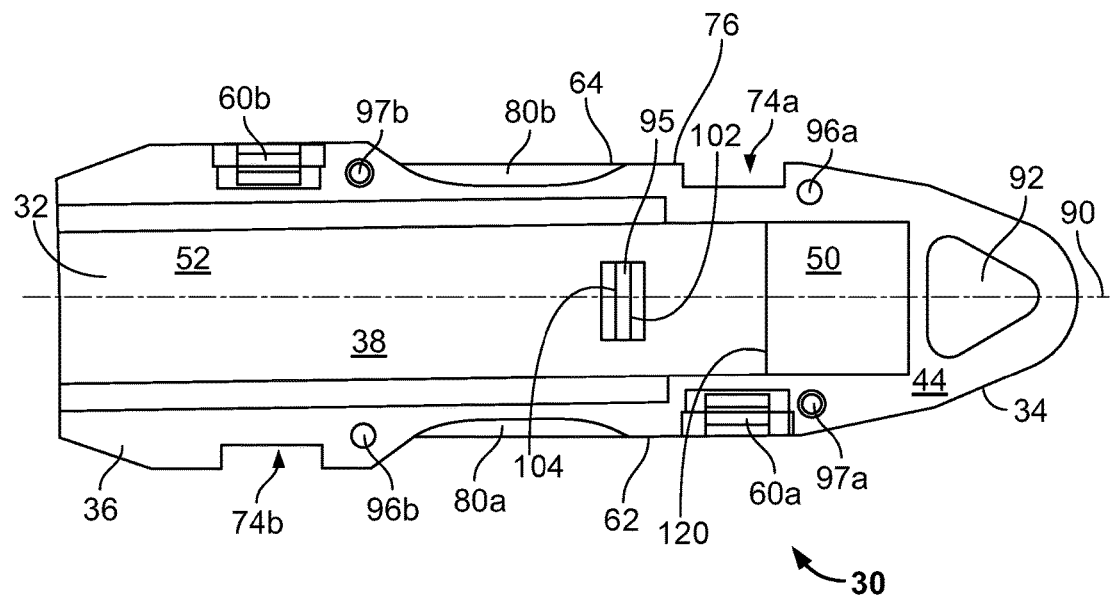
FIG. 3 is a bottom view of a first member of the cable pulling assembly of FIG. 1.
Figure 4:
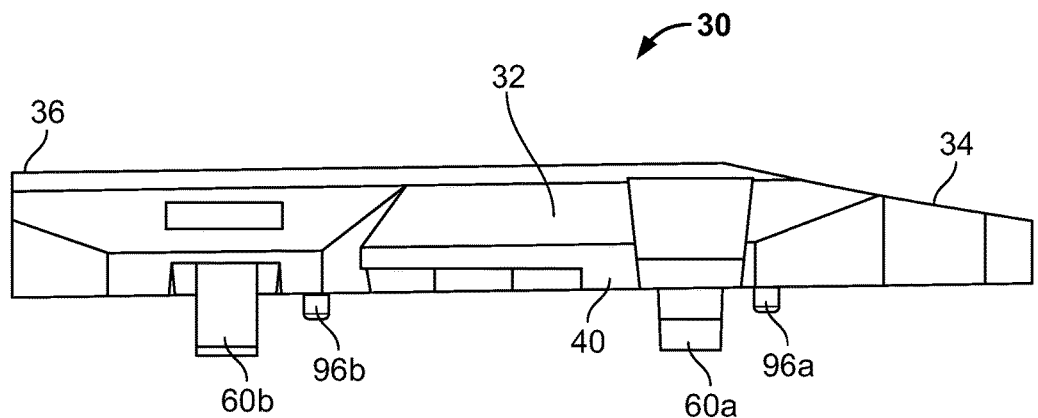
FIG. 4 is a side view of the first member of FIG. 3.
Figure 5:
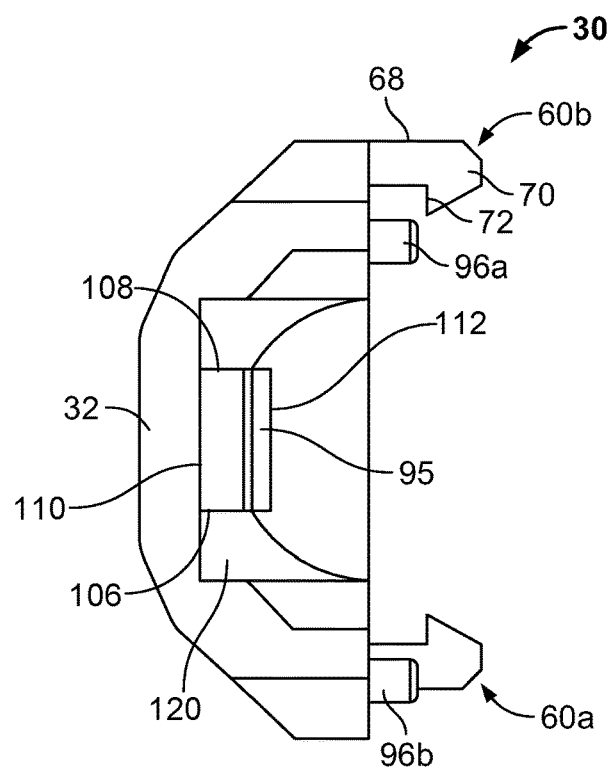
FIG. 5 is a front view of the first member of FIG. 3.
Figure 6:
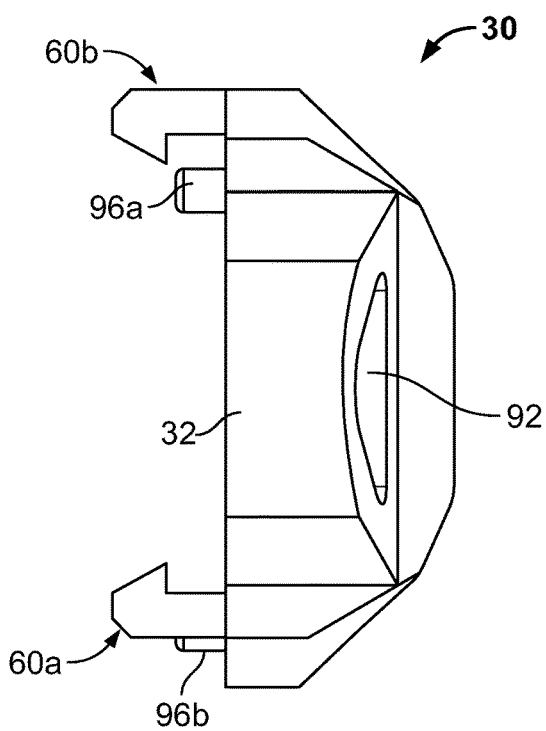
FIG. 6 is a rear view of the first member of FIG. 3.

As illustrated at FIGS. 3 and 5, the first member 30 defines a surface 120 (e.g., a shoulder, a wall, etc.) that is substantially perpendicular to a longitudinal axis 90. As depicted, the surface 120 is substantially parallel to and faces the first end 102 of the shoulder 95. The surface 120 is positioned within the connector cavity 46. As mentioned above, the second member 30' may be substantially structurally similar to the first member 30. Thus, the second member 30' may define a surface 120' (e.g., a shoulder, a wall, etc.) that is substantially perpendicular to a longitudinal axis 90'. The surface 120' may be substantially parallel to and face the first end 102' of the shoulder 95'. The surface 120' may be positioned within the connector cavity 46'.

An example SC connector and an example SC adapter are shown at U.S. Pat. No. 5,317,663, the disclosure of which is hereby incorporated by reference. Reference numbers cited herein that refer to reference numbers of U.S. Pat. No. 5,317,663 are generally written in italics. Ridges *26* and *27* of U.S. Pat. No. 5,317,663 (see FIG. 3 of U.S. Pat. No. 5,317,663) are both engaged by shoulders 95, 95' of respective first and second members 30, 30'. The ridges *26, 27* of holder *20* of U.S. Pat. No. 5,317,663 may be connected via the connector construction to the strength layer or member 18 of the cable 14. Further, the ridges *26, 27* are generally in a common location per various styles and standards for SC connector designs. The ridges *26, 27* are exposed in side openings *64, 66* (i.e., cut-outs) of a slideably mounted grip housing of U.S. Pat. No. 5,317,663. The grip housing of U.S. Pat. No. 5,317,663 generally corresponds to a grip housing 16 (i.e., a release sleeve) of the connector 15. The side openings *64, 66* of U.S. Pat. No. 5,317,663 generally correspond to the voids 17, 17' of the connector 15. As depicted at FIG. 2, the voids 17, 17' are openings through the grip housing 16 of the connector 15. The holder *20* of U.S. Pat. No. 5,317,663 generally corresponds to the inner front housing 93 of the connector 15. The ridges *26, 27* of the connector of U.S. Pat. No. 5,317,663 generally correspond to the ridges 98, 98' of the connector 15.

The ridges *26, 27* of the connector of U.S. Pat. No. 5,317,663 and the ridges 98, 98' of the connector 15 are also used to releasably mate with retaining clips *425, 435* in example adapter *10* of U.S. Pat. No. 5,317,663 for securing the connector of U.S. Pat. No. 5,317,663 and/or the connector 15 in place. In particular, as is known in the art of SC connectors and SC adapters, while inserting the SC connector 15 into a main body *205* of the adapter of U.S. Pat. No. 5,317,663, the pair of retaining clips *425, 435* are initially spread apart from each other upon the SC connector 15 entering. Upon the ridges 98, 98', *26, 27* of the connector passing beyond latches of the pair of retaining clips 425, 435, the pair of retaining clips 425, 435 resiliently return toward each other and the latches engage the ridges 98, 98', 26, 27 of the connector.

As depicted at FIG. 2, the grip housing 16 of the connector 15 includes a first pair of ramps 28 and a second pair of ramps 29. As mentioned above, the connector 15 may be symmetric or substantially symmetric. Thus, the grip housing 16 of the connector 15 further includes a third pair of ramps 28' and a fourth pair of ramps 29'. While inserting the SC connector 15 into the main body 205 of the adapter of U.S. Pat. No. 5,317,663, the pair of retaining clips 425, 435 are initially spread apart from each other by the first pair of ramps 28 and the third pair of ramps 28' upon the SC connector 15 entering. In particular, the latches of the pair of retaining clips 425, 435 ride up on the pairs of ramps 28, 28' and thereby spread the retaining clips 425, 435 away from each other. Upon the latches of the pair of retaining clips 425, 435 reaching the voids 17, 17' of the grip housing 16, the latches are urged into the voids 17, 17', respectively, and engage the ridges 98, 98'.

To remove the connector 15 from the adapter of U.S. Pat. No. 5,317,663, the grip housing 16 of the connector 15 is pulled away from the adapter. This pulling action engages the second pair of ramps 29 and the fourth pair of ramps 29' with the pair of retaining clips 425, 435, and the retaining clips 425, 435 ride up the ramps 29, 29' and thereby are spread away from each other by the ramps 29, 29'. Upon the latches of the pair of retaining clips 425, 435 becoming clear of the ridges 98, 98' and being lifted out of the voids 17, 17' of the grip housing 16, the connector 15 is pulled out of the adapter of U.S. Pat. No. 5,317,663. The grip housing 16 may be spring loaded toward the position illustrated at FIG. 2 and thereby prevent the ramps 29, 29' from lifting the latches of the pair of retaining clips 425, 435 out of the voids 17, 17' of the grip housing 16 unless the grip housing 16 is pulled upon.

The connector cavity 46 further includes a first end portion 50, disposed in the first axial end portion 34 of the body 32, and a second end portion 52, disposed in the second axial end portion 36. The first end portion 50 of the connector cavity 46 is adapted to receive a portion of the dust cap 21, disposed over the first axial end 22 of the connector 15. The second end portion 52 is adapted to receive a portion of the connector 15.

The sidewall 40 of the body 32 includes a first resilient tab 60a and a second resilient tab 60b. In one aspect of the present disclosure, the first resilient tab 60a is disposed at the first axial end portion 34 of the body 32, while the second resilient tab 60b is disposed at the second axial end portion 36 of the body 32.

In one aspect of the present disclosure, the first and second resilient tabs 60a, 60b are substantially structurally similar. As the first and second resilient tabs 60a, 60b are substantially similar, the first and second resilient tabs 60a, 60b will be collectively and singularly referred to as resilient tab 60 for ease of description purposes.

The resilient tab 60 includes a base end 66 and a free end 68. The base end 66 is engaged to the sidewall 40. In one aspect of the present disclosure, the base end 66 is integral with the sidewall 40. The free end 68 extends outwardly from the second end 44 of the sidewall 40 in a direction that is generally perpendicular to the second end 44. The free end 68 includes a lip portion 70 that extends outwardly from the free end 68. The lip portion 70 includes a lip 72.

The sidewall 40 of the body 32 defines a first groove 74a disposed in an exterior surface 76 of the sidewall 40 that extends from the second end 44 of the sidewall 40 toward the base 38 of the body 32. In one aspect of the present disclosure, the first groove 74a is disposed at the first axial end portion 34 of the first member 30 on a second side 64 of the body 32. In another aspect of the present disclosure, the first groove 74a is generally aligned with the first resilient tab 60a disposed on a first side 62 of the body 32. The first groove 74a includes a first rim 78a.

The sidewall 40 of the body 32 further defines a second groove 74b disposed in the exterior surface 76 of the sidewall 40 that extends from the second end 44 of the sidewall 40 toward the base 38 of the body 32. In one aspect of the present disclosure, the second groove 74b is disposed in the second axial end portion 36 of the first member 30 on the first side 62 of the body 32. In another aspect of the present disclosure, the second groove 74b is generally aligned with the second resilient tab 60b disposed on the second side 64 of the body 32. The second groove 74b includes a second rim 78b.

In one aspect of the present disclosure, the first member 30 defines the longitudinal axis 90 that extends in an axial direction from the first end portion 34 to the second end portion 36. The first member 30 further defines a thru-passage 92 disposed in the first end portion 34 of the body 32. The thru-passage 92 is a hole that extends through the second end 44 of the sidewall 40 at the first end portion 34 in a direction that is generally perpendicular to the longitudinal axis 90. The thru-passage 92 is adapted to receive a pulling member (e.g., a rope, a chain, etc.) for pulling the cable pulling assembly 10 through a passage.

In one aspect of the present disclosure, the second end 44 of the sidewall 40 of the body 32 defines a first recess 80a. The first recess 80a may be oriented in the exterior surface 76 of the sidewall 40 on the first side 62 of the body 32. The first recess 80a is disposed between the first and second resilient tabs 60a, 60b. In one aspect of the present disclosure, the first recess 80a is disposed equidistantly between the first and second resilient tabs 60a, 60b along the longitudinal axis 90.

In one aspect of the present disclosure, the second end 44 of the sidewall 40 further defines a second recess 80b. The second recess 80b may be orientated in the exterior surface 76 of the sidewall 40 on the second side 64 of the body 32. In one aspect of the present disclosure, the second recess 80b is symmetrically aligned about the longitudinal axis 90 to the first recess 80a. In another aspect of the present disclosure, the second recess 80b is disposed equidistantly between the first and second resilient tabs 60a, 60b along the longitudinal axis 90.

The body 32 further includes a plurality of alignment guides 96. In the depicted embodiment of FIG. 3, the first member 30 includes a first alignment guide 96a and a second alignment guide 96b. The first and second alignment guides 96a, 96b extend in a direction that is generally perpendicular to the second end 44. In the depicted embodiment of FIG. 3, the first and second alignment guides 96a, 96b are generally cylindrical in shape.

The first and second alignment guides 96a, 96b are disposed on opposite sides of the central longitudinal axis 90. The first alignment guide 96a is disposed in the first axial end portion 34 of the body 32 while the second alignment guide 96b is disposed in the second axial end portion 36.

The longitudinal surface of the second end 44 defines a plurality of alignment openings 97a and 97b. The alignment openings 97a, 97b of the first member 30 are adapted to receive corresponding alignment guides 96a', 96b' of the second member 30', respectively. In the depicted embodiment of FIG. 3, the longitudinal surface of the second end 44 defines a first alignment opening 97a and a second alignment opening 97b. The first and second alignment openings 97a, 97b are disposed on opposite sides of the central longitudinal axis 90. The first alignment opening 97a is disposed in the first axial end portion 34 of the body 32, while the second alignment opening 97b is disposed in the second axial end portion 36. The first alignment opening 97a is axially aligned with the first alignment guide 96a but disposed on the opposite side of the central longitudinal axis 90. Likewise, the second alignment opening 97b is axially aligned with the second alignment guide 96b but disposed on the opposite side of the central longitudinal axis 90.

The installation of the end 13 of the fiber optic cable 14 into the cable pulling assembly 10 will now be described. A first portion of the connector 15 is inserted into the connector cavity 46 of the first member 30. During installation, the shoulder 95 attached to the base 38 of the first member 30 passes through the void 17 in connector 15 and engages a ridge 98 in the ferrule holder 93. As discussed earlier, similar engagement may occur with a second shoulder 95' attached to the second member 30', and the second shoulder 95' passes through a similarly symmetric void 17' on the opposing side of the SC connector 15 and is orientated to engage a similarly symmetric ridge 98' on the opposite side of the SC connector 15.

In certain embodiments, the first member 30 longitudinally captures the inner front housing 93 of the SC connector 15 along the longitudinal axis 90. In particular, the surface 120 of the first member 30 engages an end 99 of the inner front housing 93, and the first end 102 of the shoulder 95 of the first member 30 engages the ridge 98 of the inner front housing 93. As the surface 120 and the first end 102 of the shoulder 95 face each other, the inner front housing 93 is captured between the surface 120 and the first end 102 of the shoulder 95, even though the grip housing 16 largely surrounds the inner front housing 93. As mentioned above, the second member 30' may be substantially structurally similar to the first member 30, and the connector 15 may be symmetric or substantially symmetric. Thus, the second member 30' may also longitudinally capture the inner front housing 93 of the connector 15 along the longitudinal axis 90'. In particular, the surface 120' of the second member 30' may engage the end 99 of the inner front housing 93, and the first end 102' of the shoulder 95' of the second member 30' may engage the ridge 98' of the inner front housing 93. As the surface 120' and the first end 102' of the shoulder 95' face each other, the inner front housing 93 may also be captured between the surface 120' and the first end 102' of the shoulder 95', even though the grip housing 16 largely surrounds the inner front housing 93.

Installation may also include aligning the first member 30 and second member 30' using the alignment guides 96a, 96b of the first member 30 and alignment guides 96a' and 96b' of the second member 30'. Accordingly, the alignment guide 96a of the first member 30 may engage the alignment opening 97a' of the second member 30'. The alignment guide 96b of the first member 30 may engage the alignment opening 97b' of the second member 30'. Similarly, the alignment guide 96a' of the second member 30' may engage the alignment opening 97a of the first member 30. The alignment guide 96b' of the second member 30' may engage the alignment opening 97b of the first member 30. In one aspect of the present disclosure, the first member 30 is in snap-fit engagement with the second member 30'.

To secure a connection between the first member 30 and second member 30', the resilient tabs 60a, 60b, 60a', 60b' of the member 30, 30' will engage the grooves 74a', 74b', 74a, 74b on the opposing member 30', 30. As the second member 30' engages the first member 30, the first resilient tab 60a of the first member 30 enters the first groove 74a' of the second member 30', while the first resilient tab 60a' of the second member 30' enters the first groove 74a of the first member 30. The second resilient tab 60b of the first member 30 enters the second groove 74b' of the second member 30', while the second resilient tab 60b' of the second member 30' enters the second groove 74b of the first member 30. The second member 30' is fully engaged to the first member 30 when the lips 72 of the first and second resilient tabs 60a, 60b of the first member 30 are engaged with the first and second rims 78a', 78b' of the second member 30', and when the lips 72' of the first and second resilient tabs 60a', 60b' of the second member 30' are engaged with the first and second rims 78a, 78b of the first member 30.

With the end 13 of the fiber optic cable 14 disposed in the enclosure 12 of the cable pulling assembly 10, the fiber optic cable 14 can be pulled through passages (e.g., conduits, etc.). In certain embodiments, as the cable pulling assembly 10 is pulled, the second end portion 52 of the connector cavity 46 of the enclosure 12 is engaged with the second axial end 26 of the connector 15. The tensile force from pulling the cable pulling assembly 10 is applied to the second axial end 26 of the connector 15. As the connector 15 is crimped to the strength layer 18 of the fiber optic cable 14, the tensile force applied to the connector through the second portion 52 of the enclosure 12 is transferred to the strength layer 18.

In certain embodiments, the shoulder 95 of the first member 30 passes through the void 17 in the grip housing 16 and engages the ridge 98 of the inner front housing 93 of the connector 15, and the shoulder 95' of the second member 30' passes through the void 17' in the grip housing 16 and engages the ridge 98' of the inner front housing 93 of the connector 15. As the shoulders 95, 95' engage their respective ridges 98, 98', the first member 30 and the second member 30' engage and connect to each other, as described above. With the end 13 of the fiber optic cable 14 disposed in the enclosure 12 of the cable pulling assembly 10, the fiber optic cable 14 can be pulled through passages (e.g., conduits, etc.). As the cable pulling assembly 10 is pulled, the shoulders 95, 95' of the connector cavity 46 of the enclosure 12 respectively engage the ridges 98, 98' of the inner front housing 93 of the connector 15. The tensile force from pulling the cable pulling assembly 10 is thereby applied to the inner front housing 93 of the connector 15. As the connector 15 is secured to the strength layer 18 and/or the outer jacket 20 of the fiber optic cable 14, the tensile force applied to the connector through the shoulders 95, 95' of the enclosure 12 is transferred to the strength layer 18 and/or the outer jacket 20 of the fiber optic cable 14.

In certain embodiments, the tensile force from pulling the cable pulling assembly 10 is not substantially applied to the second axial end 26 of the connector 15.

Referring now to FIG. 1, the removal of the end 13 of the fiber optic cable 14 from the cable pulling assembly 10 will be described. The enclosure 12 defines an indentation 94. The indentation 94 is formed from the first recess 80a in the first member 30 and the first recess 80a' in the second member 30' when the first and second members 30, 30' are engaged. The indentation 94 includes a width W that is greater than a height H. The indentation 94 is adapted to receive a tool (e.g., a flat tipped tool, a flat-head screwdriver, a coin, etc.). In certain embodiments, a second indentation, not shown, may be formed, and the second indentation is symmetric about the longitudinal axis of the enclosure 12 to the indentation 94.

To disengage the second member 30' from the first member 30, a generally flat tip of the tool is inserted into the indentation 94. The tip of the tool includes a width that is greater than a height of the tip. The tool is then rotated so that one edge of the flat tip of the tool contacts the second member 30' while an opposite edge of the flat tip contacts the first member 30. The tool is then rotated until the first member 30 is disengaged from the second member 30'.

In one embodiment, the tool is a coin. In this embodiment, the coin is inserted into the indentation 94 and rotated about an axis of the coin that extends along a diameter of the coin. The coin is rotated so that one edge of the coin contacts the second member 30' while an opposite edge of the coin contacts the first member 30. The coin is rotated until the first member 30 is disengaged from the second member 30'.

The enclosure 12 of the cable pulling assembly 10 includes a first member 30 and a second member 30'. In one embodiment, the first and second members 30, 30' are manufactured from a transparent material. In another embodiment, the first and second members 30, 30' are manufactured from a translucent material. In another embodiment, one of the first and second members 30, 30' is transparent or translucent. The transparent or translucent material allows the contents of the enclosure 12 to be viewed without disengaging the first and second members 30, 30'.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A removable cable pulling assembly comprising:
    a removable enclosure adapted for enclosing an end of a fiber optic cable, wherein the end of the fiber optic cable includes an SC-type (SC) connector with a release sleeve, the removable enclosure including:
        a removable first member defining a first cavity, the first cavity being adapted and contoured to removably engage a first portion of an SC connector and the first cavity being adapted to receive the end of the fiber optic cable, wherein the first cavity defines a first shoulder, wherein the first shoulder is positioned on the removable first member to engage and pass through a first opening defined in the release sleeve; and
        a removable second member being adapted to removably engage the removable first member, the removable second member defining a second cavity, wherein the second cavity defines a second shoulder, wherein the second shoulder is positioned on the removable second member to engage and pass through a second opening defined in the release sleeve opposite to the first opening;
    wherein the removable enclosure is adapted to transfer a tensile force applied to the removable enclosure to a strength layer of the fiber optic cable.

2. The removable cable pulling assembly of claim 1, wherein the first cavity receives a portion of the SC connector and the second cavity receives a remaining portion of the SC connector.

3. The removable cable pulling assembly of claim 1, wherein the removable enclosure is adapted to engage an axial end of the SC connector when the tensile force is applied to the removable enclosure so that the tensile force is applied to the strength layer through the SC connector.

4. The removable cable pulling assembly of claim 1, wherein each of the removable first member and second member includes a plurality of resilient tabs and a plurality of grooves, the plurality of grooves of the removable first member being adapted to receive the plurality of resilient tabs of the removable second member and the plurality of grooves of the removable second member being adapted to receive the plurality of resilient tabs of the removable first member.

5. The removable cable pulling assembly of claim 4, wherein each of the removable first member and the removable second member includes a first resilient tab and a second resilient tab, the first resilient tab and the second resilient tab being disposed on opposite sides of a longitudinal axis of the removable enclosure.

6. The removable cable pulling assembly of claim 1, wherein at least one of the removable first member and the removable second member is translucent.

7. The removable cable pulling assembly of claim 1, wherein the removable second member is structurally identical to the removable first member.

8. The removable cable pulling assembly of claim 1, further comprising a cable terminated by an SC connector, wherein the removable enclosure engages at least one ridge, and preferably two ridges, of the SC connector inner front housing.

9. The removable cable pulling assembly of claim 1, wherein when the first and second shoulders engage and pass through the respective first and second openings, the first and second shoulders respectively engage first and second ridges on opposite sides of the release sleeve.

10. A removable cable pulling assembly comprising:
    a removable enclosure adapted for enclosing an end of a fiber optic cable, wherein the end of the fiber optic cable includes an SC connector, the removable enclosure including:
        a removable first member, the removable first member including:
            a first body having a longitudinal surface, the first body defining a first blind cavity having an opening in the longitudinal surface of the first body, wherein the first blind cavity is defined by a first shoulder, wherein the first shoulder is positioned on the removable first member to engage and pass through a first opening defined in the SC connector, when the first shoulder passes through the first opening, the first shoulder engages a first catch of the SC connector; and
            a first plurality of resilient tabs engaged to the first body, the first plurality of resilient tabs extending beyond the longitudinal surface of the first body; and
        a removable second member, the removable second member including:
            a second body having a longitudinal surface, the second body defining a second blind cavity having an opening in the longitudinal surface of the second body, wherein the second blind cavity is defined by a second shoulder, wherein the second shoulder is positioned on the longitudinal surface of the second body to engage and pass through a second opening defined in the SC connector, when the second shoulder passes through the second opening, the second shoulder engages a second catch of the SC connector; and a second plurality of resilient tabs engaged to the second body, the second plurality of resilient tabs extending beyond the longitudinal surface of the second body, the second plurality of resilient tabs adapted for engagement with the removable first member;

wherein the end of the fiber optic cable is enclosed between the first blind cavity and the second blind cavity;

wherein the removable enclosure is adapted to transfer a tensile force applied to the removable enclosure to a strength layer of the fiber optic cable.

11. The removable cable pulling assembly of claim 10, wherein the longitudinal surface of each of the first body and the second body includes a plurality of alignment guides that extends outwardly from the longitudinal surface of the first body and the longitudinal surface of the second body.

12. The removable cable pulling assembly of claim 10, wherein each of the removable first member and the removable second member defines a thru-passage that extends through a first axial end portion of each of the removable first member and the removable second member.

13. The removable cable pulling assembly of claim 10, wherein the removable first member includes a first plurality of grooves adapted to receive the second plurality of resilient tabs of the removable second member and the removable second member includes a second plurality of grooves adapted to receive the first plurality of resilient tabs of the removable first member.

14. The removable cable pulling assembly of claim 10, wherein at least one of the removable first member and the removable second member is translucent.

15. The removable cable pulling assembly of claim 10, wherein the removable second member is structurally identical to the removable first member.

16. A cable pulling assembly comprising:
a fiber optic cable having an end;
an SC connector engaged to the end of the fiber optic cable; and
a removable enclosure enclosing the SC connector of the fiber optic cable, the removable enclosure including:
a removable first member defining a first cavity, the first cavity being adapted and contoured to removably engage a portion of the SC connector of the fiber optic cable, wherein the first cavity is defined by a first shoulder wherein the first shoulder is positioned on the removable first member to engage and pass through a first void defined in the SC connector; and
a removable second member being removably engaged to the removable first member, the removable second member defining a second cavity, the second cavity being adapted and contoured to receive a remaining portion of the SC connector of the fiber optic cable, wherein the second cavity is defined by a second shoulder, wherein the second shoulder is positioned on the removable second member to engage and pass through a second void defined in the SC connector;
wherein the removable enclosure is adapted to engage an axial end of the SC connector when a tensile force is applied to the removable enclosure so that the tensile force is applied to a strength layer of the fiber optic cable through the SC connector.

17. The cable pulling assembly of claim 16, wherein the removable second member is structurally identical to the removable first member.

18. The cable pulling assembly of claim 16, wherein when the first and second shoulders engage and pass through the respective first and second voids, the first and second shoulders respectively engage first and second ridges on opposite sides of the SC connector.

19. A method for installing a cable pulling assembly, the method comprising:
placing a fiber optic cable in a cavity defined by an enclosure having a first member and a second member;
passing a first shoulder of the first member through a first opening defined in an SC connector, wherein when the first shoulder passes through the first opening of the SC connector, the first shoulder engages a first catch of the SC connector;
aligning at least one resilient tab attached to the first member with at least one groove in the second member; and
engaging the at least one resilient tab attached to the first member with the at least one groove in the second member.

20. The method of claim 19, further comprising passing a second shoulder attached to the second member through a second opening defined in the SC connector opposite the first opening, when the second shoulder passes through the second opening of the SC connector, the second shoulder engages a second catch of the SC connector.

21. The method of claim 19, further comprising aligning the at least one resilient tab attached to the second member with at least one groove in the first member and engaging the at least one resilient tab attached to the second member with the at least one groove in the first member.

22. The method of claim 19, further comprising aligning at least one installation guide attached to the first member with at least one alignment opening in the second member and engaging the at least one installation guide attached to the first member with the at least one alignment opening in the second member.

* * * * *